US007420968B2

(12) United States Patent
Donoghue et al.

(10) Patent No.: US 7,420,968 B2
(45) Date of Patent: Sep. 2, 2008

(54) HIGH-SPEED SWITCH ARCHITECTURE

(75) Inventors: Bryan J. Donoghue, St. Albans (GB); Richard A. Gahan, Gorey (IE); Kam Choi, Tring (GB); Edele O'Malley, Ashtown (IE); Eugene O'Neill, Castleknock (IE)

(73) Assignee: 3Com Corporation, Marlborough, MA (US)

( * ) Notice: Subject to any disclaimer, the term of this patent is extended or adjusted under 35 U.S.C. 154(b) by 951 days.

(21) Appl. No.: 10/456,702

(22) Filed: Jun. 6, 2003

(65) Prior Publication Data

US 2004/0151195 A1 Aug. 5, 2004

(30) Foreign Application Priority Data

Feb. 1, 2003 (GB) ................... 0302314.0

(51) Int. Cl.
*H04L 12/50* (2006.01)
*H04Q 11/00* (2006.01)
(52) U.S. Cl. .................. 370/387; 370/388; 370/249
(58) Field of Classification Search .......... 370/412, 370/359, 366, 423, 424, 419, 357, 386, 360, 370/361, 367, 368, 387, 388, 428, 429, 248, 370/249, 252; 714/716, 717
See application file for complete search history.

(56) References Cited

U.S. PATENT DOCUMENTS

| 5,124,978 | A | * | 6/1992 | Chao ................... 370/422 |
| 5,255,265 | A | | 10/1993 | Eng |
| 5,267,235 | A | | 11/1993 | Thacker |
| 5,754,532 | A | | 5/1998 | Dev |
| 5,892,932 | A | | 4/1999 | Kim |
| 5,940,596 | A | | 8/1999 | Rajan |
| 6,078,963 | A | | 6/2000 | Civanlar |
| 6,125,112 | A | | 9/2000 | Koning |
| 6,263,393 | B1 | | 7/2001 | Funaya |
| 6,324,165 | B1 | * | 11/2001 | Fan et al. ............... 370/232 |
| 6,400,730 | B1 | * | 6/2002 | Latif et al. .............. 370/466 |
| 6,501,761 | B1 | | 12/2002 | Pannell |
| 6,801,950 | B1 | | 10/2004 | O'Keeffe |
| 6,999,452 | B1 | | 2/2006 | Drummond-Murray |
| 7,164,863 | B2 | * | 1/2007 | Lange et al. ............. 398/79 |
| 2003/0026287 | A1 | | 2/2003 | Mullendore |

(Continued)

FOREIGN PATENT DOCUMENTS

GB 2 336 074 10/1999

(Continued)

OTHER PUBLICATIONS

Bagheri, Mehran, Dennis T. Kong, Wayne S. Holden, Fernando C. Irizarry, and Derek D. Mahoney, "An STS-N Byte-Interleaving Multiplexer/Scrambler and Demultiplexer/Descrambler Architecture and its Experimental OC-48 Implementation," IEEE/ACM Transactions on Networking. vol. 1, No. 3, Jun. 1993.*

*Primary Examiner*—Doris To
*Assistant Examiner*—Ian N Moore

(57) ABSTRACT

A system of switch modules contains input demultiplexers connected to ports on each of the modules and output multiplexers connected to each of the modules. Each module has output and input interfaces for mesh links and at least one output interface is looped back to an input interface on the same module. The arrangement reduces module-to-module traffic and corresponding increases the transmit bandwidth of a module.

7 Claims, 9 Drawing Sheets

U.S. PATENT DOCUMENTS

| | | |
|---|---|---|
| 2003/0118021 A1 | 6/2003 | Donoghue |
| 2003/0193938 A1 | 10/2003 | Ayandeh |
| 2003/0210685 A1 | 11/2003 | Foster |
| 2004/0218597 A1 | 11/2004 | Choi |
| 2006/0007859 A1 | 1/2006 | Kadambi |

FOREIGN PATENT DOCUMENTS

| | | |
|---|---|---|
| GB | 2 336 075 | 10/1999 |
| GB | 2344032 | 5/2000 |
| WO | 97/19407 | 5/1997 |

\* cited by examiner

HIGH-SPEED SWITCH ARCHITECTURE

FIELD OF THE INVENTION

This invention relates to communication networks and particularly packet-based communication networks. More particularly the invention relates to a switch architecture by means of which a switching device can be connected between relatively high-capacity transmission links employing a multiplicity of comparatively lower capacity transmission paths.

BACKGROUND TO THE INVENTION

A modern architecture for a network switch comprises a multiplicity of modules, typically each provided on a respective silicon chip, wherein each module has a receiving section for processing data packets received on a multiplicity of ports, a switching section, which transmits those packets on one or other of a multiplicity of links, usually called 'mesh' links, and a transmitting section, which is connected to receive packets from a multiplicity of mesh links and provides for transmission of packets on one or other of a multiplicity of output ports. In a typical example, the switching section can direct packets to any one of four mesh links and the transmitting section can receive packets from any one of four mesh links.

One way of connecting such modules to form in effect a single switch is to connect one mesh link per module to the transmitting section of the same module and to connect each of the other three mesh links to a transmitting section in each of the other three modules. Although such a configuration is useful, it may be unsatisfactory where the modules have ports with an aggregate bandwidth capacity which is in excess of the link bandwidth, for example, if a module has 16 ports each having a data rate of 2.5 gigabits/sec, providing an possible aggregate of 40 gigabits/sec, and the links each have a maximum data rate of 10 gigabits/sec, there would be a severe loss of potential performance if for example most of the received traffic has to be directed to a particular link. The loss of performance would not be apparent if the traffic is evenly distributed to the four links, but such a distribution cannot be presumed.

It is known to couple a comparatively high-speed link, such as one having a 10-gigabit per second data rate, to a multiplicity of ports of a switch, of which the ports have a comparatively lower data rate, by means of a de-multiplexer or distributor. Thus for example a 10-gigabit per second link may be coupled to four ports each having a 2.5-gigabit per second data rate. Likewise, a group of transmit ports of the switch can be connected to a multiplexer which provides a common output on a comparatively high frequency serial link. Thus, for example, four transmit ports operable at a 2.5 gigabit per second rate may feed a common 10 gigabit per second link.

SUMMARY OF THE INVENTION

The basis of the present invention is a versatile architecture which preferably allows connection of the modules in the configuration previously described, wherein the mesh links carry module-to-module traffic, but also allows connection in a configuration wherein at least one and possibly each one of the mesh links of each switch module is looped back to drive the transmitting section of the same switch module. Such an architecture preferably includes demultiplexer/multiplexer units which are coupled to drive or be driven by ports of all the switch modules. An advantage of such a configuration is that there is a reduction of module-to-module traffic by way of the mesh links and accordingly the mesh links in effect produce a substantial increase in the transmission bandwidth of each of the switch modules.

Further features and advantages of the invention will become apparent from the following description with reference to the accompanying drawings.

DETAILED DESCRIPTION

Figure 1:
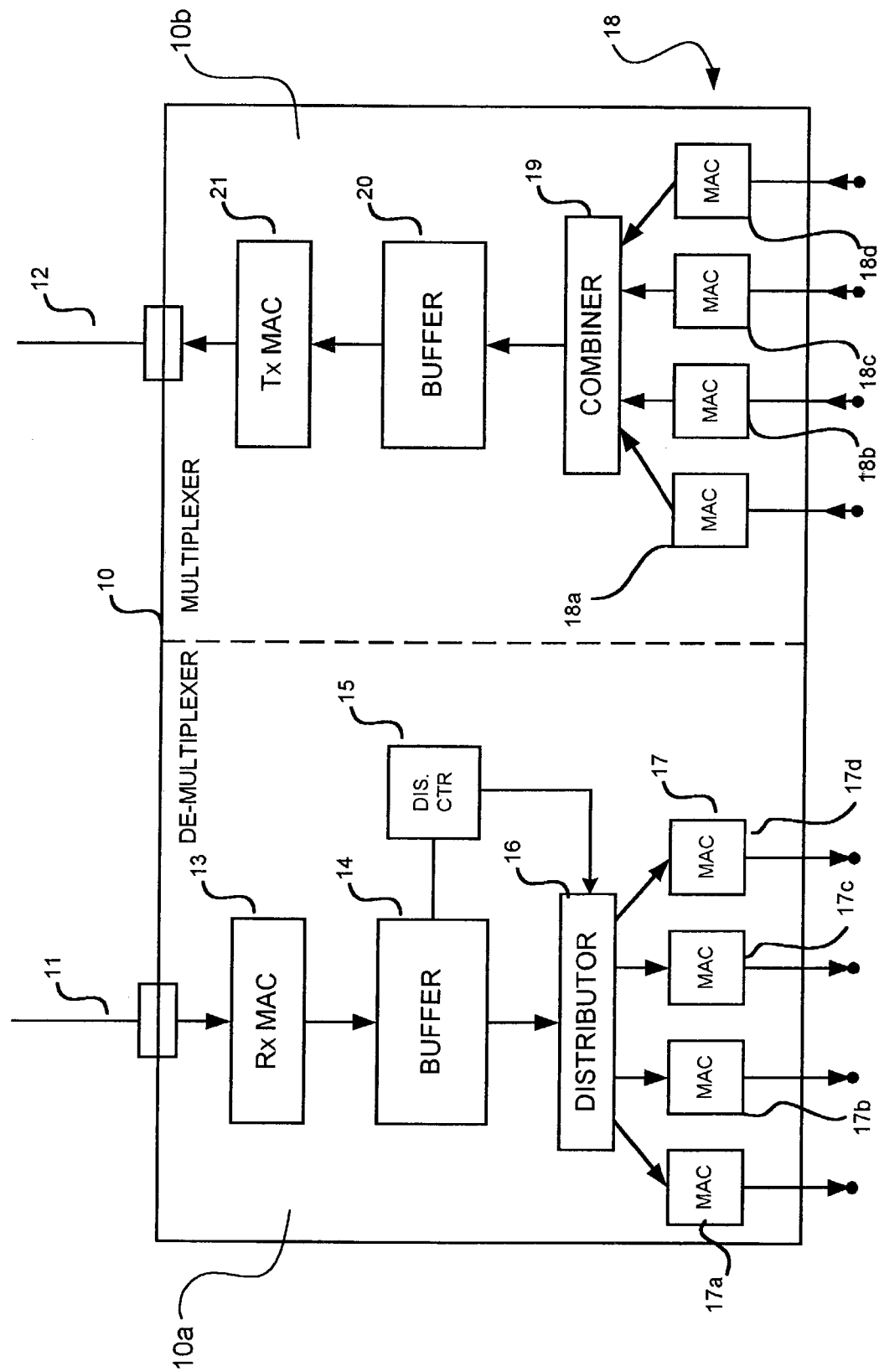
FIG. 1 illustrates a demultiplexer/multiplexer unit.

FIG. 1 of the drawings illustrates schematically one form of input/output device, specifically a de-multiplexer/multiplexer composed of two distinct parts 10a, 10b, of which the left-hand part 10a is a de-multiplexer which distributes data packets received over a high-speed link 11, typically at 10 gigabits per second, to a multiplicity of lower speed outputs 17, typically four outputs at 2.5 gigabits per second. The right-hand side 10b of the input/output device 10 is a multiplexer which combines a multiplicity of lower speed inputs 18 to a single common comparatively high-speed serial output 12 and in particular combines four inputs at 2.5 gigabits per second into a single common output at 10 gigabits per second.

More particularly, an input line 11 having a maximum data rate of 10 gigabits per second is coupled to an input channel constituted in this embodiment by a receiving media access control device (RxMAC) 13. Data, which may be serial data in the form of data packets, are received from the line 11 and are temporarily stored in a buffer 14. From there the packets are, under the control of a distribution controller (DIS.CTR) 15, distributed by way of a distributor 16 to a multiplicity of output channels herein constituted by media access control devices 17a, 17b, 17c and 17d, each of which is connected to a respective output port The distribution controller 15 preferably controls the distributor 16 to provide an even distribution of the input packets to the four outputs. Various techniques are available for achieving such an even distribution. The distribution controller 15 may operate on a round-robin basis or it may employ a hashing algorithm wherein address data (typically destination address data) is hashed to a short digital word which is used as a select input for the distributor 16. To take a simple example, the hashing algorithm may reduce, typically by exclusive-or arithmetic, a destination address word to a 2-bit word, of which the four possible states each determine a respective output MAC for the relevant packet.

The output multiplexer 10b receives four inputs each by way of a respective port coupled to one of the MACs 18a to 18d each constituting an input channel. Packets from the MACs 18a to 18d are coupled to a combiner 19 and stored temporarily in a buffer 20 whence they are transmitted by way of a transmit media access control device (TxMAC) 21, herein constituting a single output channel, through an output port to the high-speed serial line 12. Herein the combiner 19 is provided only to ensure proper addressing of the buffer 20; packets are stored as they arrive and the combiner may direct packets from different ones of the MACs to different parts of the buffer 20. There exists a variety of techniques for ensuring proper sharing of buffer space should buffer space which is allocated to a particular input MAC be close to fullness.

Figure 2:
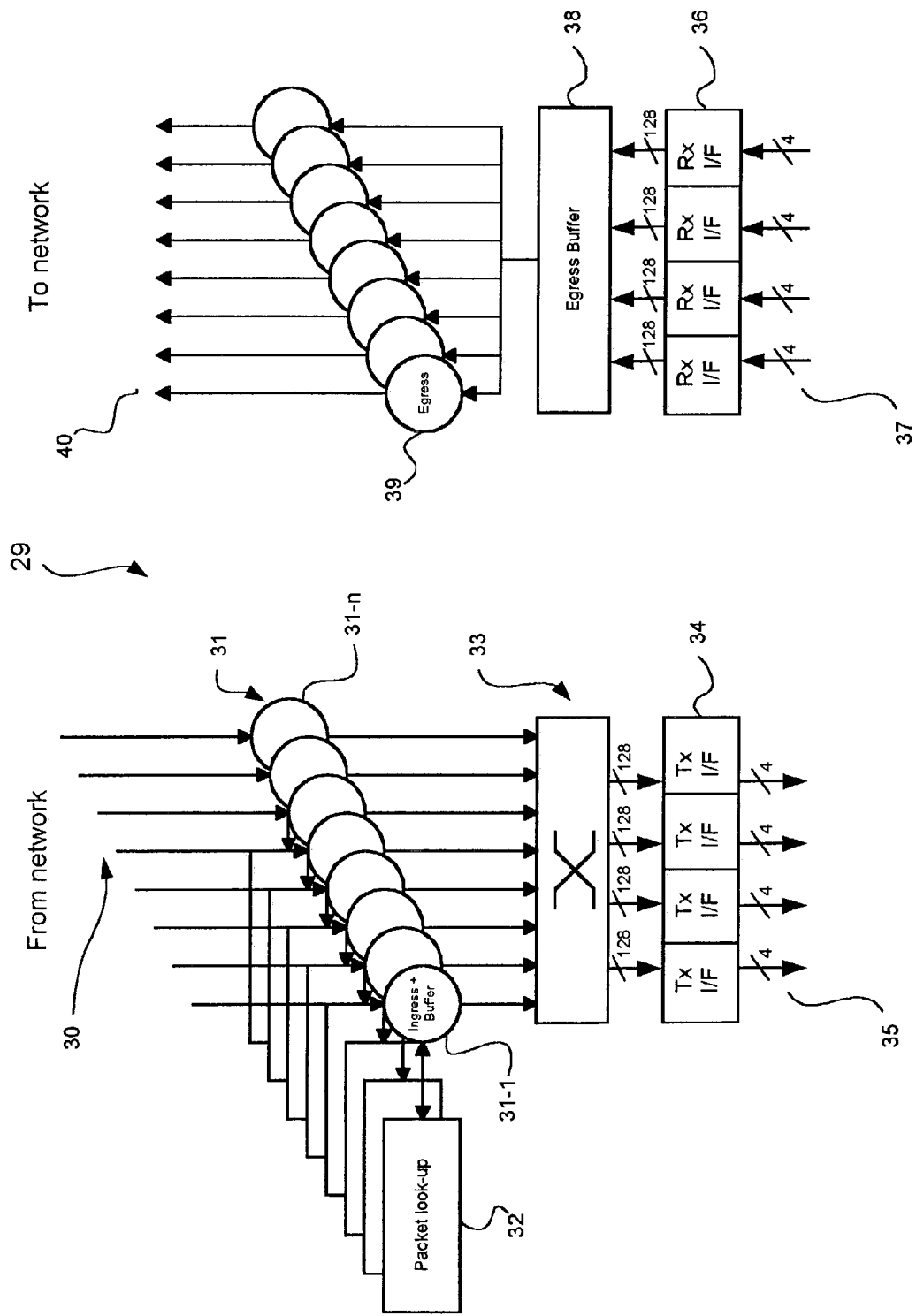
FIG. 2 illustrates one example of the architecture of a switch module for use in the present invention.

At least one and usually at least two of the de-multiplexer/multiplexers shown in FIG. 1 would be provided for each switch module as shown in FIG. 2, depending on the relative numbers of ports.

FIG. 2 illustrates a switch module. This is preferably though not essentially constituted on a single chip. FIG. 2 illustrates a single module; how the modules may be combined will be explained with reference to later Figures.

It should be understood that there is a variety of different architectures available for the switch module 29 shown in FIG. 2. In essence it comprises a receiving section, which receives packets from a multiplicity of ports denoted 30, coupled to input processors 31-*l* to 31-*n*. The module performs look-ups 32 for the received packets. These look-ups may be performed in a customary manner and will normally comprise employing address data as a key in a search engine which will retrieve forwarding data for the respective packet from a look-up database. The packets (and status words which include the forwarding data) are sent to a switching core 33. The core 33 will direct packets in accordance with their intended destinations to one or other of a multiplicity of transmit (Tx) interfaces 34 each of which can provide data on a respective mesh link 35. A specific example of an interface 34 is described below with reference to FIG. 4. In this example there are four interfaces, each of which provides a transition for the data from a comparatively low frequency clock domain and a comparatively wide parallel form (e.g. 128 bits) to a higher frequency clock domain and provides data in a narrower form such as on four parallel lines. Such a transition in width is desirable because otherwise the terminal or 'pin' requirements become too great for practical implementation.

The switch module also has a transmit section which includes receiving (Rx) interfaces 36 (four in this example) each of which receives serial data on each of four mesh links 37 (which may or may not be, depending on the configuration, the same as mesh links 35). The interface 36 provides wider parallel data at a lower clock frequency to an egress buffer 38 which provides outputs to egress processors 39 each of which is coupled to a respective output port in a set of output ports 40. Each port 30 may be combined with a port 40 as a duplex port. The processors 39 perform the conventional processing of packets required before they are transmitted from the output ports 40 in accordance with the appropriate transmission standard. One of the interfaces 36 is described below with reference to FIG. 5.

Figure 3:
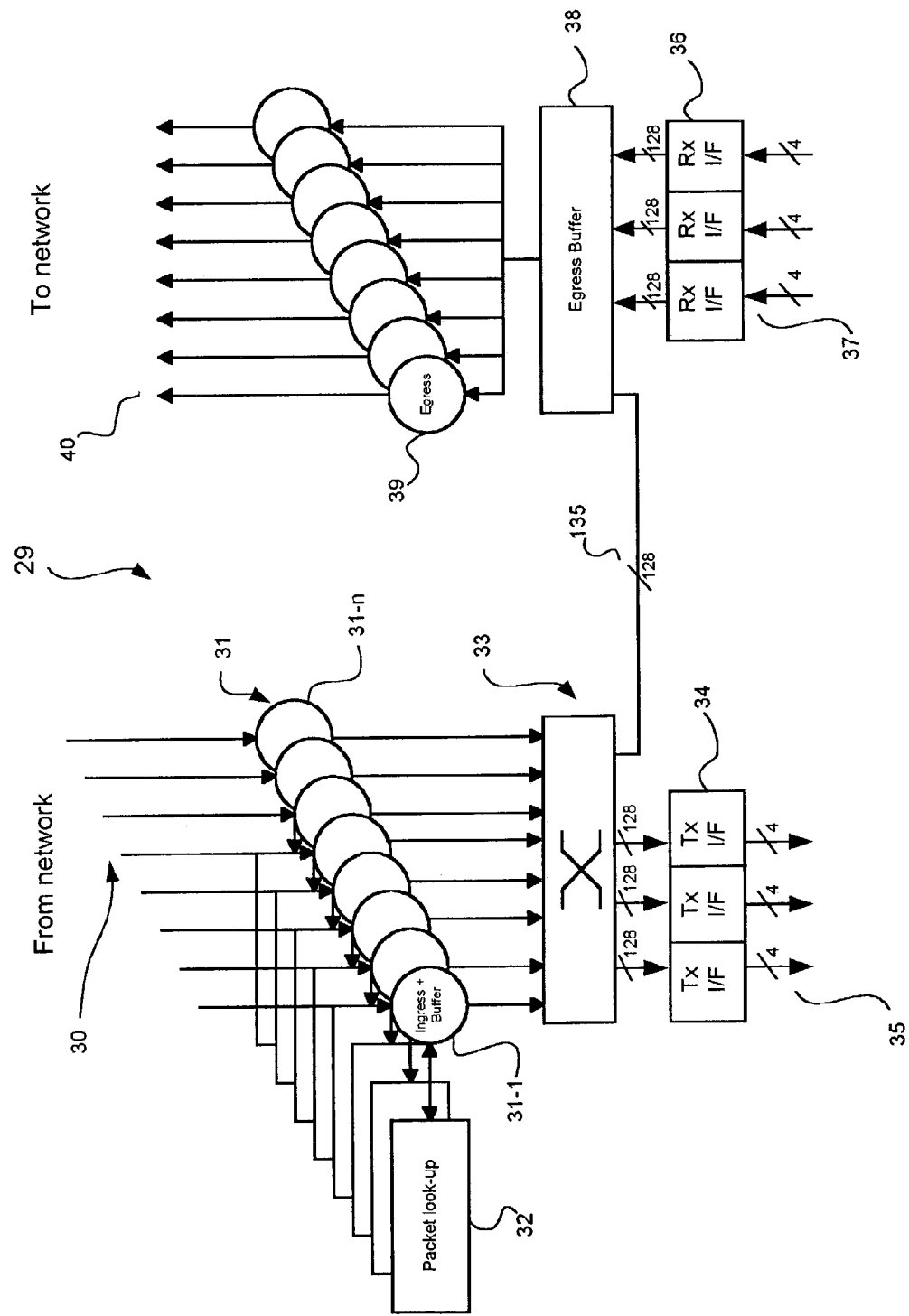
FIG. 3 illustrates another example of the architecture of a switch module for use in the present invention.

As will be apparent later, it is usually necessary to provide a link between the receiving section of a switch module and the transmit section. For the switch module shown in FIG. 2, this may be achieved by connecting one of the mesh links 35 to the one of the Rx interfaces 36. However, as shown in FIG. 3, which otherwise resembles FIG. 2, one of the Tx interfaces 34 and one of the Rx interfaces 36 may be omitted and the connection between the sections of the switch may be constituted by an internal, full width (e.g. 128-bit) path 135.

Figure 4:
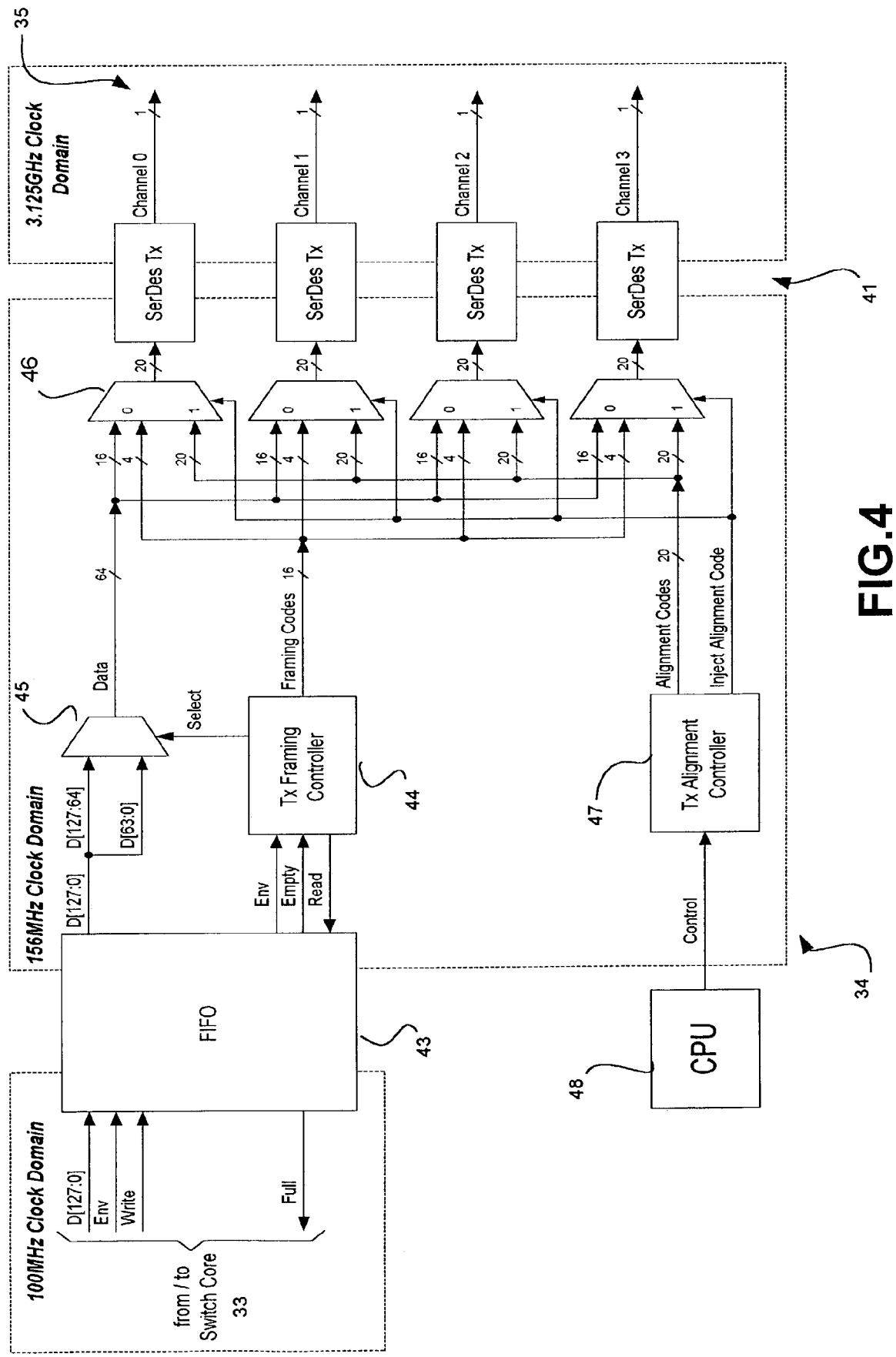
FIG. 4 illustrates an output interface of a switch module.

FIG. 4 illustrates a transmit interface 34 in greater detail.

In order to reduce substantially the comparatively large width of the parallel data (in this embodiment 128 bits) provided by the switching core for possible transmission over a mesh link, the interface 34 employs serialisers. In this example each link has a multiplicity of channels (four channels) each including a serialiser 41. In this example the serialisers are constituted by the transmit (Tx) sections of commercially available serialiser/deserialisers ('serdes') of which the receive sections constitute the deserialisers 42 shown in FIG. 5. The transmit section of each serdes has a 20-bit parallel input interface running at 156 MHz, and a single serial output interface running at 3.125 Gbps. The receive section has a single serial input interface running at 3.125 Gbps, and a 20-bit parallel output interface running at 156 MHz. Such devices are commercially available as separate ASICs or as 'cores' that can be embedded within an ASIC.

The interface 34 needs therefore to cope with a clock-speed transition between the switching core 33 and the link serdes 41, a data-bus width difference between the switching-core and the link serdes 41, a transfer of the packet-lookup results and an indication of the start and end of a packet on the link.

In this embodiment the clock domain of the switching core is at 100 MHz, and the (higher frequency) clock domain of the mesh links is at 3.125 GHz.

The clock-speed transition between the switching-core 33 and the link serdes 41 is handled by means of a FIFO 43. The switching core can write to the FIFO faster than data can be sent onto the link, so the FIFO can provide a 'Full' signal to inform the switching core 33 that it must pause the writing of packet data to the FIFO 43. The switching-core 33 only begins writing to the FIFO 43 when it has a full packet, so the FIFO 43 can never become empty half way through a packet. 'Env' is an envelope signal for the packet, indicating that the FIFO word contains valid packet data. Env goes high for the duration the packet. The first 128 bits of the 'packet' constitutes a status word which contains the packet-look-up results, and the exact length of the packet (which may not coincide with a 128-bit boundary). In this example data is supplied to the FIFO 43 from the switching core in 128-bit wide parallel form.

Figure 6:
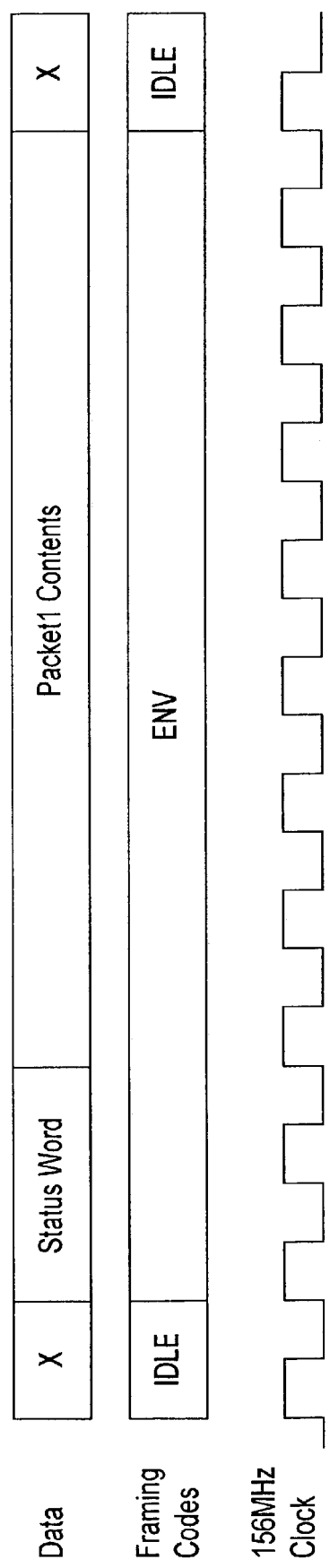
FIG. 6 is a timing diagram.

A Tx Framing Controller controls writing of data to the serialisers (serdes) 41. Upper and lower sixty-four bits of the FIFO are alternately written to the link by way of a multiplexer 45 of which the select line is controlled by controller 44. The 64 bits of data is split into 4*16-bit paths and is sent on each of the four serdes 41 by way of multiplexers 46 controlled by a Tx alignment controller 47 controlled by CPU 48. The spare 4 * 4 bits of the serdes are used to send framing codes. The framing codes contain the framing characters ENV (envelope—effectively the signal Env) and IDLE (between packets). FIG. 6 shows how the framing characters are used for the transmission of a 64-byte packet (preceded by a 128-bit Status Word). The Tx framing controller 47 generates the framing code ENV for the packet (including Status Word) and IDLE for the gap between packets.

The Tx alignment controller 47 also allows a 20-bit 'alignment code' to be sent on the high-speed links in place of the normal transmitted data. These codes can be used by the receive section (FIG. 5) to align data on the high-speed link.

As noted above the serdes are serial encoder and decoder devices. The transmit side has a 20-bit parallel input interface running at 156 MHz, and a single serial output interface running at 3.125 Gbps. The receive-side has a single serial input interface running at 3.125 Gbps, and a 20-bit parallel output interface running at 156 MHz Such devices are commercially available as separate ASICs or as 'cores' that can be embedded within an ASIC.

Figure 5:
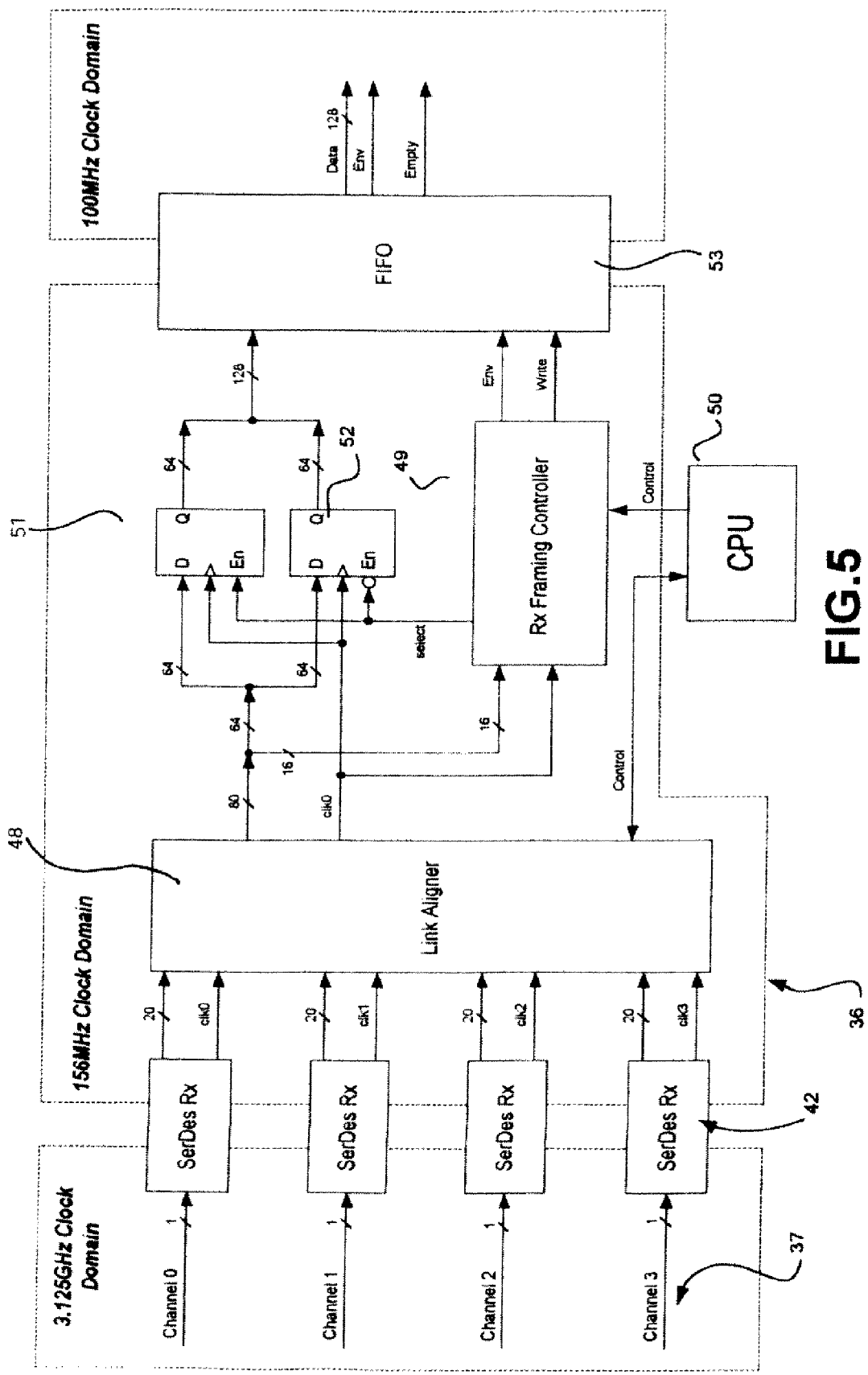
FIG. 5 illustrates an input interface of a switch module.

FIG. 5 illustrates one example of an Rx interface 36 which receives signals on one of the high-speed mesh links. In practical terms it needs to provide temporal alignment of each link, regeneration of the Env signal (which indicates the start and end of packet), accommodation of a data-bus width difference between the link serdes and the internal blocks (such as the egress buffer) and a corresponding clock-speed transition.

There are two alignment problems for data received on the serdes: bit rotation of data within a serdes channel, and clock offset between the channels. The 20 bits of data output by each of the serdes might be arbitrarily rotated. This means that bits [0:19] output by the serdes could correspond to bits [N:19] of one 20-bit word and bits [0:N−1] of the next 20-bit word. One mechanism to overcome this bit-rotation is to characterise the channel initially by sending a known 'alignment code'. The link aligner 48 can then select the appropriate bits from consecutive 20-bit words to compensate for the bit-rotation. The clocks output by the Rx serdes will have the same frequency (because the serial signals originate from the same clock source) but may have relative phase delays. There are known techniques to eliminate the phase delays and resynchronise the channels to one clock (clk0): examples are described in GB-2336074 and GB-2336075.

An Rx framing controller 49 controlled by a CPU 50 regenerates the Env signal from the framing codes. The Rx framing controller also co-ordinates by means of 64-ply sets of D-bistables 51 and 52 the de-multiplexing of 64-bit data words into 128-bit data words before they are written into a FIFO 53. The clock-speed transition between the serdes (156 MHz) and the egress buffer (100 MHz) is handled by the FIFO 53. There is no danger of the FIFO 53 overflowing because the egress buffer is able to read from the FIFO 53 faster than the Rx framing controller is able to write to the FIFO, because 128-bit words are written on every other cycle of the 156 MHz clock.

Figure 7:
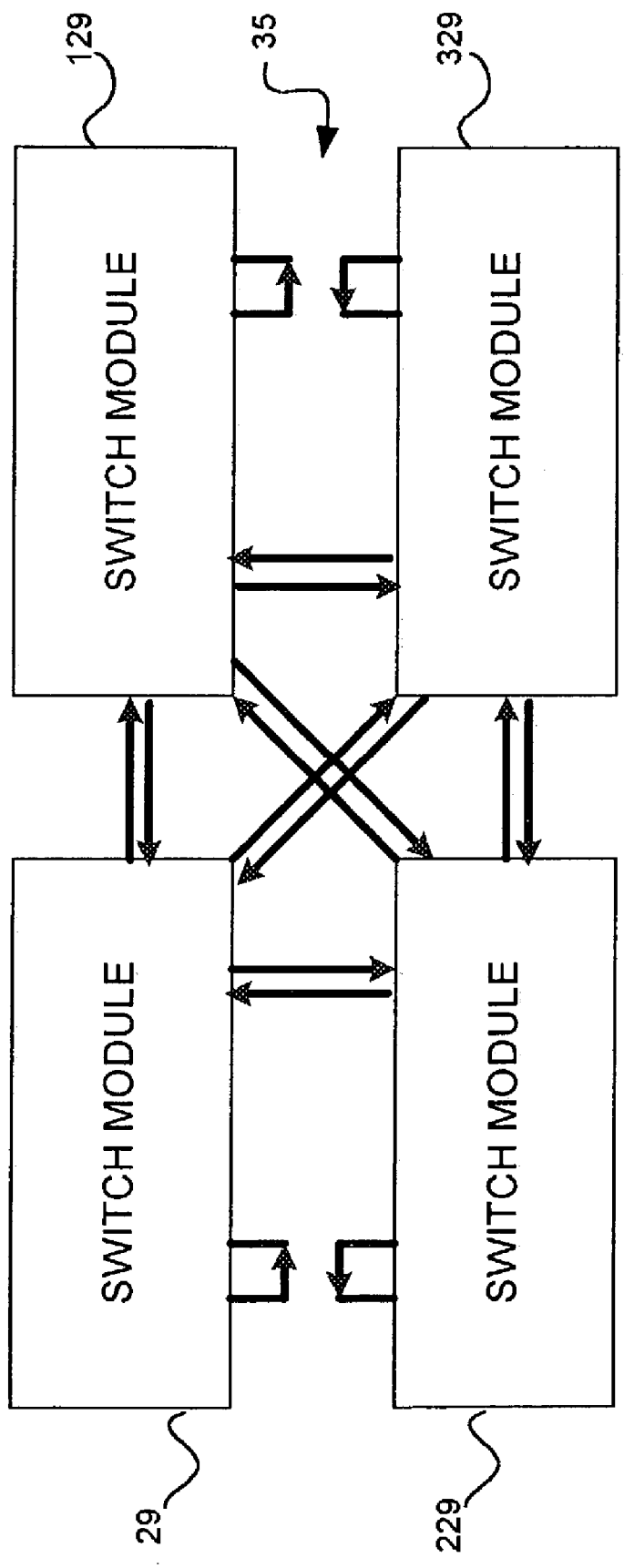
FIG. 7 is a schematic diagram of four switch modules.

FIG. 7 illustrates a possible manner of connecting together four modules 29, 129, 229 and 329 each corresponding to a module 29 as shown in FIG. 2. The four modules are connected so that for each module one mesh link is 'looped back' from a Tx interface 34 to an Rx interface 36, whereas the other links are each connected to an Rx interface in one of the other modules. Alternatively the loop-back may be an internal connection as shown in FIG. 3. The ports of each of the switch modules may be connected to an external network and the four modules in effect constitute a single switch having the aggregate of ports on the modules.

It may be noted that for some purposes not all the mesh links may be used. For example, a switch may be constituted either by a single module or two or three modules.

Figure 8:
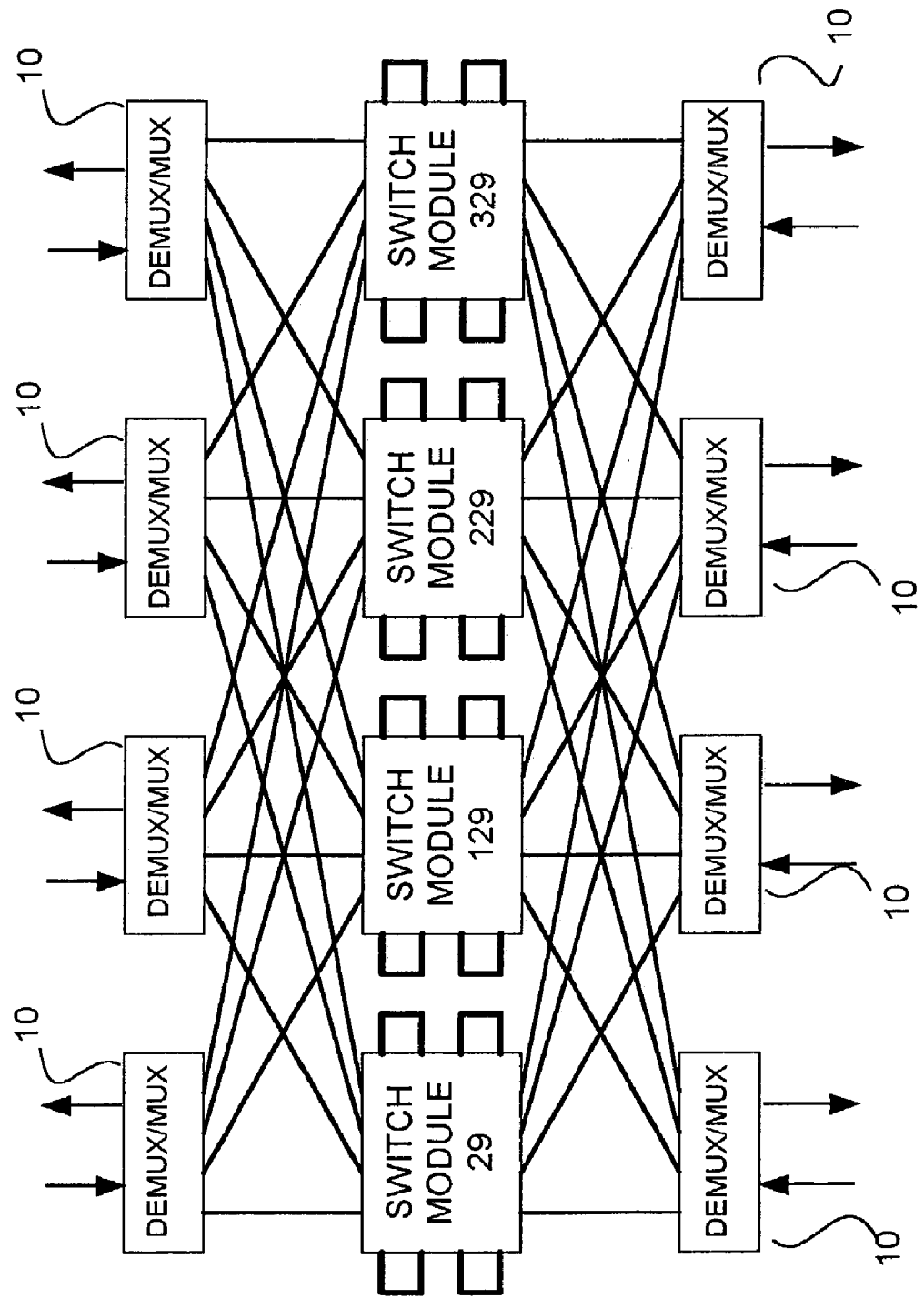
FIG. 8 is a schematic diagram of four switch modules and associated demultiplexer/multiplexers in one configuration in accordance with the invention.

FIG. 8 illustrates a configuration which may employ the same number of switch modules as in FIG. 7 but can inherently provide a greater transmit bandwidth.

In particular, there are output lines from each de-multiplexer section of the demultiplexer/multiplexers 10 to the Rx ports of all the switch modules, so that the packets input on each input high-speed line 11 (FIG. 1) are distributed among all the switch modules, preferably in a manner which provides an even distribution as previously described.

Likewise, all the multiplexer sections of the demultiplexer/multiplexers 10 are coupled to receive from 'transmit' ports of all the switch modules 29, 129 etc.

In this architecture, the mesh links of each switch module are all looped-back so that each of the Tx interfaces 34 of a module is connected to a respective Rx interface 36 on the same module. The Tx interfaces 34 and the Rx interfaces 36 are shown in FIGS. 2 and 3.

It will be observed that in the arrangement of FIG. 8, there is no module-to-module traffic. However, other configurations are feasible, and can provide an improvement in transmit bandwidth.

Figure 9:
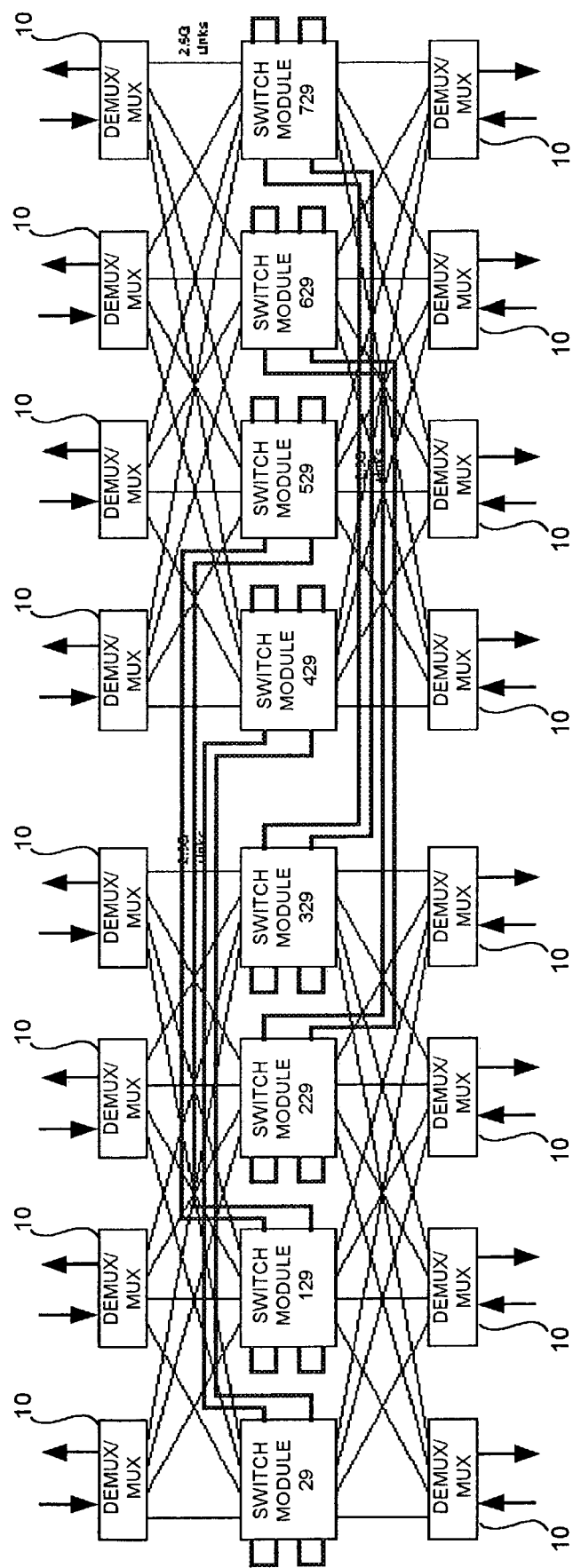
FIG. 9 is a schematic diagram of eight switch modules and associated demultiplexer/multiplexers in another configuration in accordance with the invention.

FIG. 9 illustrates another example of the invention. In this example there are eight modules, 29, 129, 229, 329, 429, 529, 629 and 729, in two groups 29-329 and 429-729. For each group the multiplexers and demultiplexers are cross-connected to the ports of the modules as described with reference to FIG. 8, each multiplexer being connected to a receive port of each module in the group and each multiplexer being connected to a transmit port of each module in the group. Each module has two of its mesh links (of which one may be internal) looped back to the same module as previously described. However, each module in the first group has its other mesh links connected to a module in the second group, so that module 29 and module 429 are connected by mesh links, modules 129 and 529 are connected by mesh links and so on.

One of the inherent limitations in switches which have mesh links as described previously is the limitation on the transmission bandwidth by virtue of the module-to-module mesh links. In the present invention, the versatility of the modular switch is preserved while allowing configurations wherein the capacity of a mesh link is no longer a limit on the performance of the switch composed of a multiplicity of such modules.

The invention claimed is:

1. A switching system comprising:
   (a) a multiplicity of switching modules, wherein each module includes:
      (i) a plurality of receiving ports;
      (ii) a switching core;
      (iii) at least one output interface for the conversion of data packets at a relatively low clock frequency into data packets at a substantially higher clock frequency on an external link,
      (iv) at least one input interface for the conversion of received data packets at said substantially higher clock frequency from a link into data packets at said relatively low clock frequency;
      (v) a plurality of transmit ports for the forwarding of data packets from said input interface
   (b) a multiplicity of input demultiplexers each having an input channel and a multiplicity of output channels; and
   (c) a multiplicity of output muitiplexers each having a multiplicity of input channels and a respective single output channel:
   wherein each input demultiplexer has at least one of its output channels connected to a receiving port on each of the switch modules and each output multiplexer has at least one of its input channels connected to a transmit port on each of the switch modules; and wherein at least one of said output interfaces is connected to and transmits data packets to an input interface on the same module, wherein each output interface comprises a multiplicity of channels each including a seriaIiser coupled to a respective line and each input interface comprises a multiplicity of channels each including a line coupled to a respective deserialiser.

2. A switching system according to claim 1 wherein at least one output interface of each of the switch modules is connected by a respective link to one of said input interface of the same switch module.

3. A switching system according to claim 2 wherein each output interface of each of the switch modules is connected by a respective link to one of said input interface of the same switch module.

4. A switching system according to claim 1 wherein each output interface comprises at least one channel including a serialiser and each input interface comprises at least one channel including a deserialiser.

5. A switching system according to claim 1 wherein each output interface converts wide parallel data signals at said relatively low clock frequency into narrower data packets at a substantially higher clock frequency on a respective multiplicity of lines, each of said output interfaces including a first FIFO store, a multiplicity of output channels each including a serialiser and a demultiplexing and framing system, operating at a clock frequency intermediate said relatively low clock frequency and said substantially higher clock frequency, for coupling said FIFO store to the respective serialisers; and each input interface converts narrower data packets at said substantially higher clock frequency from a respective multiplicity of lines into wide parallel data packets at said relatively low clock frequency, each of the multiplicity of input interfaces including a second FIFO store and a multiplexing and framing system, operating at a clock frequency intermediate said relatively low clock frequency and said substantially higher clock frequency, for coupling the respective deserialisers to said second FIFO store.

6. A switching module comprising:
a plurality of receiving ports;
a switching core providing relatively wide parallel data packets at a relatively low clock frequency;
a multiplicity of output interfaces for the conversion of wide parallel data packets at said relatively low clock frequency into narrower data packets at a substantially higher clock frequency on a respective multiplicity of lines, each of said output interfaces including a first FIFO store, a multiplicity of output channels each including a serialiser and a demultiplexing and framing system, operating at a clock frequency intermediate said relatively low clock frequency and said substantially higher clock frequency, for coupling said FIFO store to the respective serialisers;
a multiplicity of input interfaces for the conversion of narrower data packets at said substantially higher clock frequency from a respective multiplicity of lines into wide parallel data packets at said relatively low clock frequency, each of the multiplicity of input interfaces including a deserialiser, a second FIFO store and a multiplexing and framing system, operating at a clock frequency intermediate said relatively low clock frequency and said substantially higher clock frequency, for coupling the respective deserialisers to said second FIFO store;
wherein at least one of said output interfaces is connected to and transmits data packets to a respective one of said input interfaces on the same module; and
a plurality of transmit ports for the forwarding of data packets from said second FIFO store wherein at least one of said output interfaces is connected to a respective one of said input interfaces on the same module.

7. A switching module according to claim 6 and including a buffer store between said second FIFO store and said transmit ports.

* * * * *